United States Patent
Iguchi et al.

(10) Patent No.: US 10,538,845 B2
(45) Date of Patent: Jan. 21, 2020

(54) YTTRIUM OXYFLUORIDE SPRAYED COATING AND METHOD FOR PRODUCING THE SAME, AND SPRAYED MEMBER

(71) Applicant: NGK SPARK PLUG CO., LTD., Nagoya, Aichi (JP)

(72) Inventors: Mabito Iguchi, Sendai (JP); Yuuki Hayasaka, Tomiya (JP); Yasunobu Noritake, Ichinomiya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 15/626,353

(22) Filed: Jun. 19, 2017

(65) Prior Publication Data

US 2017/0370007 A1    Dec. 28, 2017

(30) Foreign Application Priority Data

Jun. 22, 2016 (JP) .................... 2016-123610
May 15, 2017 (JP) .................... 2017-096855

(51) Int. Cl.
| | | |
|---|---|---|
| C01F 17/00 | (2006.01) | |
| C09D 1/00 | (2006.01) | |
| C23C 24/10 | (2006.01) | |
| C23C 4/06 | (2016.01) | |
| C23C 4/134 | (2016.01) | |
| C23C 4/18 | (2006.01) | |
| C23C 28/04 | (2006.01) | |

(52) U.S. Cl.
CPC ........ *C23C 24/103* (2013.01); *C01F 17/0043* (2013.01); *C09D 1/00* (2013.01); *C23C 4/06* (2013.01); *C23C 4/134* (2016.01); *C23C 4/18* (2013.01); *C23C 28/042* (2013.01); *C01F 17/0062* (2013.01)

(58) Field of Classification Search
None
See application file for complete search history.

(56) References Cited

U.S. PATENT DOCUMENTS

2016/0254125 A1* 9/2016 Huang ............... H01J 37/32495
                                                                29/458
2016/0307740 A1* 10/2016 Kim .................. H01J 37/32495
2017/0114440 A1*  4/2017 Takai ........................ C23C 4/11

FOREIGN PATENT DOCUMENTS

| JP | 4985928 B2 | 6/2007 |
| JP | 2016-089241 A | 5/2016 |
| JP | 6005314 B1 | 10/2016 |

* cited by examiner

*Primary Examiner* — Colin W. Slifka
(74) *Attorney, Agent, or Firm* — Stites & Harbison, PLLC; Jeffrey A. Haeberlin; Terry L. Wright

(57) ABSTRACT

An yttrium oxyfluoride sprayed coating contains $Y_5O_4F_7$ as a main component. In the yttrium oxyfluoride sprayed coating, when the total intensity of all peaks attributable to yttrium oxyfluoride in a diffraction spectrum obtained by X-ray diffractometry is assumed to be 100, the total intensity of all peaks attributable to yttrium fluoride and yttrium oxide is less than 10. Furthermore, in an yttrium oxyfluoride-containing sprayed coating, when the total intensity of all peaks attributable to yttrium oxyfluoride and yttrium fluoride in a diffraction spectrum obtained by X-ray diffractometry is assumed to be 100, the total intensity of all peaks attributable to yttrium oxide is less than 1.

1 Claim, 2 Drawing Sheets

△ : YF₃ (ORTHORHOMBIC CRYSTAL)
▲ : YF₃ (HETEROGENEOUS PHASE)
□ : $Y_5O_4F_7$
■ : YOF

■ : YOF
□ : $Y_5O_4F_7$

YTTRIUM OXYFLUORIDE SPRAYED COATING AND METHOD FOR PRODUCING THE SAME, AND SPRAYED MEMBER

CROSS REFERENCE TO RELATED APPLICATION

The present application claims priority to Japanese Patent Application Nos. 2016-123610 and 2017-096855, which were filed on Jun. 22, 2016 and May 15, 2017, respectively, the disclosures of which are herein incorporated by reference in their entirety.

BACKGROUND OF THE INVENTION

1. Field of the Invention

The present invention relates to an yttrium oxyfluoride sprayed coating that can be formed on a member of, for example, semiconductor production apparatuses and a method for producing the yttrium oxyfluoride sprayed coating, and a sprayed member.

2. Description of the Related Art

In semiconductor production apparatuses such as chemical vapor deposition (CVD) apparatuses, physical vapor deposition (PVD) apparatuses, ion implantation apparatuses, diffusion furnaces, and etching apparatuses, highly corrosive gases and chemicals are generally used and members such as chucks in a chamber in which a process is conducted are exposed to such gases and chemicals. Thus, materials constituting the members are corroded, which generates particles. Such particles adversely affect semiconductors produced, and deteriorate the quality and decrease the yield. Therefore, a coating made of a material having resistance to such gases and chemicals is formed on the surface of each of the members. Various materials used for such a coating are known. Fluoride-based materials have been proposed in recent years (e.g., refer to PTL 1 and PTL 2).

PTL 1 discloses an anticorrosive member obtained by coating a substrate surface with a plurality of materials. The uppermost surface layer of the coating layers is formed of a fluoride of a rare-earth element, and an oxide layer of a rare-earth element with a porosity of less than 5% is disposed below the uppermost surface layer. PTL 2 discloses a coated substrate that is obtained by spraying, onto a substrate surface, a slurry prepared by dispersing a powder material containing an oxyfluoride of a rare-earth element (Ln) in an organic solvent and that includes a coating containing an oxyfluoride, a fluoride, and an oxide of a rare-earth element (Ln) as main components. The anticorrosive member in PTL 1 and the coated substrate in PTL 2 have plasma resistance to some degree.

As described above, a fluoride or oxyfluoride of, for example, yttrium has resistance to highly corrosive gases and chemicals, and is therefore useful as a coating material for members of semiconductor production apparatuses.

PATENT LITERATURE

PTL 1 is Japanese Patent No. 4985928.
PTL 2 is Japanese Unexamined Patent Application Publication No. 2016-89241.

BRIEF SUMMARY OF THE INVENTION

However, the following problems are posed when a material containing only yttrium fluoride or a material containing yttrium fluoride and yttrium oxyfluoride is sprayed. That is, in a sprayed coating formed of a material containing only yttrium fluoride, an yttrium fluoride having a heterogeneous phase (structure different from an orthorhombic crystal) is generated in addition to an orthorhombic yttrium fluoride. If the yttrium fluoride having a heterogeneous phase is exposed to heat (e.g., heat of plasma) generated during operation of a semiconductor production apparatus, the yttrium fluoride having a heterogeneous phase undergoes a phase change into an orthorhombic yttrium fluoride. Consequently, volume expansion or volume shrinkage due to the phase change occurs. This causes formation of microcracks in the sprayed coating and furthermore may cause generation of particles. To suppress the generation of an yttrium fluoride having a heterogeneous phase during spraying, spraying needs to be performed on a substrate preheated before the spraying, or a sprayed coating needs to be heat-treated.

In addition, if a material containing yttrium fluoride and yttrium oxyfluoride is sprayed, a sprayed coating containing yttrium fluoride and yttrium oxyfluoride or a sprayed coating containing yttrium fluoride, yttrium oxyfluoride, and yttrium oxide may be formed. The yttrium fluoride contained in the sprayed coating poses the same problem as above. Furthermore, the yttrium oxide contained in the sprayed coating is fluorinated by fluorine plasma used during operation of a semiconductor production apparatus. This causes volume expansion or volume shrinkage and thus may cause generation of particles.

In view of the foregoing, it is an object of the present invention to provide an yttrium oxyfluoride sprayed coating in which formation of microcracks and generation of particles are suppressed and a method for producing the yttrium oxyfluoride sprayed coating, and a sprayed member including the sprayed coating.

In an yttrium oxyfluoride sprayed coating (i.e., a sprayed coating including yttrium oxyfluoride) according to an aspect of the present invention, when a total intensity of all peaks attributable to yttrium oxyfluoride in a diffraction spectrum obtained by X-ray diffractometry is assumed to be 100, a total intensity of all peaks attributable to yttrium fluoride and yttrium oxide is less than 10.

The yttrium oxyfluoride sprayed coating according to this aspect of the present invention is preferably an yttrium oxyfluoride single-phase sprayed coating. Since yttrium fluoride that undergoes a phase change with heat and yttrium oxide that is fluorinated by fluorine plasma are not contained or only a trace amount of them is contained, the yttrium oxyfluoride sprayed coating has high stability against heating such as heat of plasma, which suppresses formation of cracks and generation of particles. Furthermore, the yttrium oxyfluoride sprayed coating can be suitably used as a sprayed coating for members of semiconductor production apparatuses.

According to another aspect of the invention, a sprayed member includes an yttrium oxide sprayed coating and an yttrium oxyfluoride sprayed coating disposed on a substrate in this order (i.e., an yttrium oxide sprayed coating disposed on a substrate and an yttrium oxyfluoride sprayed coating disposed over the yttrium oxide sprayed coating). In the yttrium oxyfluoride sprayed coating, when a total intensity of all peaks attributable to yttrium oxyfluoride in a diffraction spectrum obtained by X-ray diffractometry is assumed to be 100, a total intensity of all peaks attributable to yttrium fluoride and yttrium oxide is less than 10.

That is, the sprayed member according to this aspect of the present invention is a member including an yttrium oxide sprayed coating and an yttrium oxyfluoride sprayed coating according to an aspect of the present invention stacked on a substrate in this order. The yttrium oxide sprayed coating contributes to an improvement in the adhesion between the substrate and the yttrium oxyfluoride sprayed coating. Thus, in the sprayed member, an yttrium oxyfluoride sprayed coating having high stability against heating such as heat of plasma is formed on a substrate with high adhesion. Furthermore, the sprayed member can be suitably used as a sprayed member of semiconductor production apparatuses.

The sprayed member may further include a sprayed coating containing yttrium oxide and yttrium oxyfluoride disposed between the yttrium oxide sprayed coating and the yttrium oxyfluoride sprayed coating.

The sprayed coating containing yttrium oxide and yttrium oxyfluoride has an intermediate linear expansion coefficient between the yttrium oxide sprayed coating and the yttrium oxyfluoride sprayed coating. Therefore, the presence of the sprayed coating containing yttrium oxide and yttrium oxyfluoride can relax the thermal stress applied to the interfaces between the sprayed coatings.

According to yet another aspect of the invention, a method for producing the yttrium oxyfluoride sprayed coating (i.e., the sprayed coating including yttrium oxyfluoride) includes a step of performing plasma spraying using a powder (granule) material containing yttrium oxyfluoride and having an oxygen content of 7.0 to 11.5 mass %.

By this production method, the yttrium oxyfluoride sprayed coating can be produced.

In an yttrium oxyfluoride-containing sprayed coating (i.e., a sprayed coating including yttrium oxyfluoride) according to another aspect of the present invention, when a total intensity of all peaks attributable to yttrium oxyfluoride and yttrium fluoride in a diffraction spectrum obtained by X-ray diffractometry is assumed to be 100, a total intensity of all peaks attributable to yttrium oxide is less than 1.

Herein, the phrase "yttrium oxyfluoride-containing" means that components other than yttrium oxyfluoride may be contained. For example, yttrium fluoride may be contained.

The yttrium oxyfluoride-containing sprayed coating (i.e., the sprayed coating including yttrium oxyfluoride) according to this aspect of the present invention does not contain yttrium oxide or contains only a trace amount of yttrium oxide, and thus has high stability against heat. Therefore, formation of cracks does not occur and generation of particles can be suppressed. Accordingly, the yttrium oxyfluoride-containing sprayed coating can be suitably used as a sprayed coating for members of semiconductor production apparatuses.

According to a still further aspect of the invention, a sprayed member includes an yttrium oxide sprayed coating and an yttrium oxyfluoride-containing sprayed coating disposed on a substrate in this order (i.e., an yttrium oxide sprayed coating disposed on a substrate and an yttrium oxyfluoride sprayed coating disposed over the yttrium oxide sprayed coating). In the yttrium oxyfluoride-containing sprayed coating, when a total intensity of all peaks attributable to yttrium oxyfluoride and yttrium fluoride in a diffraction spectrum obtained by X-ray diffractometry is assumed to be 100, a total intensity of all peaks attributable to yttrium oxide is less than 1.

That is, the sprayed member according to this aspect of the present invention is a member including an yttrium oxide sprayed coating and the yttrium oxyfluoride-containing sprayed coating stacked on a substrate in this order. The yttrium oxide sprayed coating contributes to an improvement in the adhesion between the substrate and the yttrium oxyfluoride sprayed coating. Thus, in the sprayed member according to this aspect of the present invention, an yttrium oxyfluoride sprayed coating having high stability against heating such as heat of plasma is formed on a substrate with high adhesion. Furthermore, the sprayed member can be suitably used as a sprayed member of semiconductor production apparatuses.

A method for producing the yttrium oxyfluoride-containing sprayed coating (i.e., the sprayed coating including yttrium oxyfluoride) may include a step of performing high-velocity oxygen fuel (HVOF) spraying using a slurry material prepared from a powder material containing at least one of yttrium oxyfluoride and yttrium fluoride and having an oxygen content of 0 to 6.0 mass %.

Another method for producing the yttrium oxyfluoride-containing sprayed coating (i.e., the sprayed coating including yttrium oxyfluoride) may include a step of performing high-velocity plasma spraying that uses a hydrogen gas as a working gas using a powder material containing at least one of yttrium oxyfluoride and yttrium fluoride and having an oxygen content of 0 to 6.0 mass % or using a slurry material prepared from the powder material.

By these production methods, the yttrium oxyfluoride-containing sprayed coating (i.e., the sprayed coating including yttrium oxyfluoride discussed above) can be produced.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

Yttrium Oxyfluoride Sprayed Coating

Figure 1:
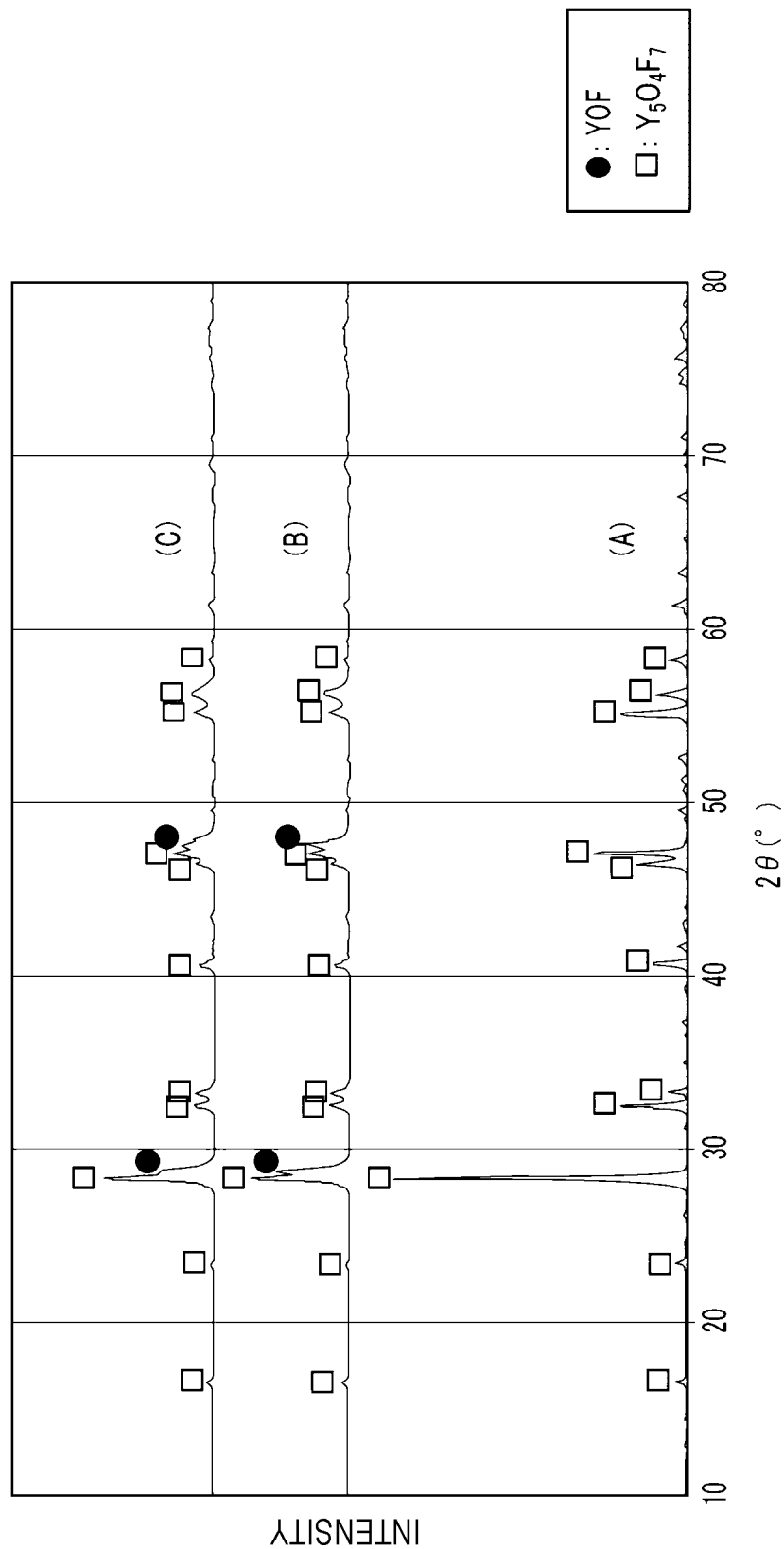
FIG. 1 illustrates X-ray diffraction spectra of a material (A), an yttrium oxyfluoride sprayed coating (B), and an annealed yttrium oxyfluoride sprayed coating (C) used in Example 1.

In an yttrium oxyfluoride sprayed coating according to an embodiment of the present invention, when the total intensity of all peaks attributable to yttrium oxyfluoride in a diffraction spectrum obtained by X-ray diffractometry is assumed to be 100, the total intensity of all peaks attributable to yttrium fluoride and yttrium oxide is less than 10.

The yttrium oxyfluoride sprayed coating according to an embodiment of the present invention contains YOF, $Y_7O_6F_9$, and $Y_6O_5F_8$ as components other than $Y_5O_4F_7$.

In the yttrium oxyfluoride sprayed coating according to an embodiment of the present invention, when the total intensity of all peaks attributable to yttrium oxyfluoride is assumed to be 100, the total intensity of all peaks attributable to yttrium fluoride and yttrium oxide is less than 10. This means that yttrium fluoride and yttrium oxide are not contained or only a trace amount of yttrium fluoride and yttrium oxide is contained. As described above, since yttrium fluoride and yttrium oxide are adversely affected by heat of plasma or the like, the total intensity of peaks of the yttrium fluoride and the yttrium oxide is preferably zero relative to the total intensity of peaks of the yttrium oxyfluoride. That is, the yttrium oxyfluoride sprayed coating preferably has a complete single phase.

Accordingly, as described above, the yttrium oxyfluoride sprayed coating according to an embodiment of the present invention is an yttrium oxyfluoride single-phase sprayed coating. That is, since yttrium fluoride that undergoes a phase change with heat of plasma and yttrium oxide that is fluorinated by fluorine plasma are not contained or only a trace amount of them is contained, the yttrium oxyfluoride sprayed coating has high stability against heating such as heat of plasma, which suppresses formation of cracks and generation of particles. Furthermore, the yttrium oxyfluoride sprayed coating can be suitably used as a sprayed coating for members of semiconductor production apparatuses.

Yttrium Oxyfluoride-Containing Sprayed Coating

In an yttrium oxyfluoride-containing sprayed coating according to an embodiment of the present invention, when the total intensity of all peaks attributable to yttrium oxyfluoride and yttrium fluoride in a diffraction spectrum obtained by X-ray diffractometry is assumed to be 100, the total intensity of all peaks attributable to yttrium oxide is less than 1.

The yttrium oxyfluoride-containing sprayed coating according to an embodiment of the present invention contains $Y_7O_6F_9$, $Y_6O_5F_8$, YOF, and $YF_3$ as components other than $Y_5O_4F_7$.

In the yttrium oxyfluoride-containing sprayed coating according to an embodiment of the present invention, when the total intensity of all peaks attributable to yttrium oxyfluoride and yttrium fluoride is assumed to be 100, the total intensity of all peaks attributable to yttrium oxide is less than 1. This means that yttrium oxide is not contained or only a trace amount of yttrium oxide is contained. As described above, since yttrium oxide is adversely affected by heat of plasma or the like, the peak intensity of the yttrium oxide is preferably zero relative to the total intensity of all peaks attributable to the yttrium oxyfluoride. That is, the yttrium oxyfluoride-containing sprayed coating preferably does not contain yttrium oxide.

Accordingly, the yttrium oxyfluoride-containing sprayed coating according to an embodiment of the present invention is a sprayed coating containing yttrium oxyfluoride and yttrium fluoride in a mixed manner. That is, since fluorinated yttrium oxide is not contained or only a trace amount of fluorinated yttrium oxide is contained, the yttrium oxyfluoride-containing sprayed coating has high stability against heating such as heat of plasma, which suppresses formation of cracks and generation of particles. Furthermore, the yttrium oxyfluoride-containing sprayed coating can be suitably used as a sprayed coating for members of semiconductor production apparatuses.

For example, when the yttrium oxyfluoride sprayed coating or yttrium oxyfluoride-containing sprayed coating according to an embodiment of the present invention is used as a coating for members of semiconductor production apparatuses, the thickness of the yttrium oxyfluoride sprayed coating or yttrium oxyfluoride-containing sprayed coating may be 10 to 1000 μm.

The yttrium oxyfluoride sprayed coating or yttrium oxyfluoride-containing sprayed coating according to an embodiment of the present invention can be produced by the production method described below.

Method for Producing Yttrium Oxyfluoride Sprayed Coating

The method for producing an yttrium oxyfluoride sprayed coating according to an embodiment of the present invention includes a step of performing plasma spraying using a powder material containing yttrium oxyfluoride and having an oxygen content of 7.0 to 11.5 mass %.

In the production method according to an embodiment of the present invention, a member on which a sprayed coating is to be formed is not particularly limited. However, a member for semiconductor production apparatuses is suitable because a sprayed coating to be formed can suppress the generation of particles as described above. Hereafter, the production method according to an embodiment of the present invention will be described in detail.

In the present invention, to form an yttrium oxyfluoride single-phase sprayed coating, plasma spraying is performed under particular conditions using a powder (granule) material containing yttrium oxyfluoride and having an oxygen content of 7.0 to 11.5 mass %.

In the present invention, the oxygen content in the material containing yttrium oxyfluoride is 7.0 to 11.5 mass %. If the oxygen content is less than 7.0 mass %, yttrium fluoride is generated in the yttrium oxyfluoride sprayed coating. If the oxygen content is more than 11.5 mass %, a crystal phase of yttrium oxide is generated in the yttrium oxyfluoride sprayed coating. The oxygen content is preferably 7.5 to 9.5 mass % and more preferably 8.0 to 9.0 mass %. The oxygen content in the material is determined by an inert gas fusion-IR method.

In the production method according to an embodiment of the present invention, a plasma spraying method is employed. The plasma spraying method is a spraying method that uses plasma flame as a heat source for softening and melting a material to be sprayed. When discharge is performed while an inert gas is caused to flow between electrodes, the inert gas is ionized and thus a high-temperature and high-velocity plasma flow is generated. In general, when an arc is generated between electrodes using an inert gas such as argon as a working gas, the working gas is formed into a plasma gas by the arc and a high-temperature and high-velocity plasma jet is emitted from a nozzle. A powder material is charged into the plasma jet and sprayed onto a substrate while being heated and accelerated. Thus, a sprayed coating is formed. In the production method according to an embodiment of the present invention, the material containing yttrium oxyfluoride may be supplied to a plasma spraying apparatus in the form of powder or may be supplied in the form of slurry during plasma spraying.

For the plasma spraying conditions, the spraying velocity is preferably 150 to 330 m/s. The spraying distance (the distance from a nozzle tip of the plasma spraying apparatus to the substrate) is, for example, 20 to 250 mm and is preferably 50 to 150 mm. The working gas is preferably a combination of Ar and $O_2$. The total gas flow rate of Ar and $O_2$ is preferably 40 to 140 L/min. The electric current is preferably 80 to 110 A, the voltage is preferably 240 to 280 V, and the electric power is preferably 19 to 31 kW. The scanning speed is preferably 100 to 1000 mm/s.

An yttrium oxyfluoride having an average particle diameter (D50) of 1 to 50 μm can be used. The form of the particles may be a granule or the particles may be constituted by only primary particles. If the average particle diameter is less than 1 μm, the particles do not adhere to the substrate because of the small weight of molten particles. If the average particle diameter is more than 50 μm, unmolten particles adhere to the substrate, which tends to make it difficult to form a sprayed coating. The material containing yttrium oxyfluoride contains at least one of YOF and $Y_5O_4F_7$ as yttrium oxyfluoride, and may further contain $YF_3$ in addition to the yttrium oxyfluoride. For example, a material having a high oxygen content contains a relatively large amount of YOF. A material having a low oxygen content contains a relatively large amount of $YF_3$. Therefore, the oxygen content in the material can be adjusted by controlling the ratio of each compound (YOF, $Y_5O_4F_7$, and $YF_3$) contained in the material. Herein, the material for yttrium oxyfluoride may contain a trace amount of $Y_7O_6F_9$ and $Y_6O_5F_8$.

The sprayed coating can be used without any further treatment, but is preferably annealed when needed. As a result of the annealing treatment, residual stress can be released. The annealing temperature is preferably 200° C. to 500° C. and the annealing time is preferably 10 to 600 minutes.

Method for Producing Yttrium Oxyfluoride-Containing Sprayed Coating

The method for producing an yttrium oxyfluoride-containing sprayed coating according to an embodiment of the present invention includes a step of performing HVOF spraying or high-velocity plasma spraying using a slurry material prepared from a powder material containing at least one of yttrium oxyfluoride and yttrium fluoride and having an oxygen content of 0 to 6.0 mass %.

In this production method, a member on which a sprayed coating is to be formed is not particularly limited. However, a member for semiconductor production apparatuses is suitable because a sprayed coating to be formed can suppress the generation of particles as described above. Hereafter, the production method according to an embodiment of the present invention will be described.

In this production method, to form an yttrium oxyfluoride-containing sprayed coating, HVOF spraying is performed under particular conditions using a slurry material prepared from a powder material containing at least one of yttrium oxyfluoride and yttrium fluoride and having an oxygen content of 0 to 6.0 mass %.

In this production method, the oxygen content in the material containing at least one of yttrium oxyfluoride and yttrium fluoride is 0 to 6.0 mass %. If the oxygen content is more than 6.0 mass %, a crystal phase of yttrium oxide is generated in the yttrium oxyfluoride sprayed coating. The oxygen content is preferably 0 to 6.0 mass %.

In this production method, an HVOF spraying method is employed. The HVOF spraying method is a spraying method that uses heat of fuel combustion as a heat source for melting a slurry material. In general, a high-temperature and high-velocity flame is emitted from a nozzle using $O_2$, kerosene, or the like as a fuel. A slurry material is charged into the flame and sprayed onto a substrate while being heated and accelerated. Thus, a sprayed coating is formed.

For the HVOF spraying conditions, the spraying velocity is preferably 200 to 1000 m/s. The spraying distance (the distance from a nozzle of the plasma spraying apparatus to the substrate) is preferably, for example, 50 to 130 mm. The fuel is preferably a combination of $O_2$ and kerosene. The scanning speed is preferably 100 to 1000 mm/s.

The average particle diameter of the slurry material containing at least one of yttrium oxyfluoride and yttrium fluoride is 0.1 to 8 μm. If the average particle diameter is less than 0.1 μm, the particles do not adhere to the substrate because the weight of molten particles is excessively small. If the average particle diameter is less than 1 μm, the particles do not easily adhere to the substrate because the weight of molten particles is small. If the average particle diameter is more than 8 μm, it is difficult to prepare a slurry, which hinders the supply of the material.

Regarding the slurry material containing at least one of yttrium oxyfluoride and yttrium fluoride, for example, a material having a high oxygen content contains a relatively large amount of YOF. A material having a low oxygen content contains a relatively large amount of $YF_3$. Therefore, the oxygen content in the material can be adjusted by controlling the ratio of each compound (YOF, $Y_5O_4F_7$, and $YF_3$) contained in the material.

The annealing treatment after the spraying is also preferably performed in the same manner as in the case of the plasma spraying.

In another method for producing an yttrium oxyfluoride-containing sprayed coating according to an embodiment of the present invention, to form an yttrium oxyfluoride-containing sprayed coating, high-velocity plasma spraying is performed under particular conditions using a powder material containing at least one of yttrium oxyfluoride and yttrium fluoride and having an oxygen content of 0 to 11.5 mass %.

In this production method, the oxygen content in the material containing at least one of yttrium oxyfluoride and yttrium fluoride is 0 to 11.5 mass %. If the oxygen content is more than 11.5 mass %, a crystal phase of yttrium oxide is generated in the yttrium oxyfluoride sprayed coating. The oxygen content is preferably 0 to 9.5 mass %.

In still another method for producing an yttrium oxyfluoride-containing sprayed coating according to an embodiment of the present invention, high-velocity plasma spraying is performed under particular conditions using a slurry material prepared from a powder material containing at least one of yttrium oxyfluoride and yttrium fluoride and having an oxygen content of 0 to 6.0 mass %. In this case, the oxygen content is 0 to 6.0 mass %. If the oxygen content is more than 6.0 mass %, a crystal phase of yttrium oxide is generated in the yttrium oxyfluoride sprayed coating.

In this production method, a high-velocity plasma spraying method is employed. The high-velocity plasma spraying method is a spraying method that uses plasma flame as a heat source for softening and melting a material to be sprayed. When an arc is generated between electrodes using an inert gas as a working gas, the working gas is formed into a plasma gas by the arc and a high-temperature and high-velocity plasma jet is emitted from a nozzle. A powder material is charged into the plasma jet and sprayed onto a substrate while being heated and accelerated. Thus, a sprayed coating is formed. In the production method according to an embodiment of the present invention, the material containing yttrium oxyfluoride may be supplied to a plasma spraying apparatus in the form of powder or may be supplied in the form of slurry during plasma spraying.

For the high-velocity plasma spraying conditions, the spraying velocity is preferably 600 to 700 m/s. The spraying distance (the distance from a nozzle tip of the plasma spraying apparatus to the substrate) is, for example, 20 to 250 mm and is preferably 90 to 130 mm. The working gas is preferably a combination of Ar, $N_2$, and $H_2$. The total gas flow rate of Ar and $N_2$ is preferably 40 to 350 L/min. The gas flow rate of $H_2$ is preferably 0 to 70 L/min and more preferably 0 to 10 L/min.

If the gas flow rate of $H_2$ is excessively high, a reaction of $YOF+H_2 \rightarrow Y_2O_3+HF$ proceeds and $Y_2O_3$ is generated. It is also believed that, if the gas flow rate of $H_2$ is increased, the amount of heat generated by plasma increases, which increases the rate of the above-mentioned reaction and facilitates the generation of $Y_2O_3$. Therefore, the gas flow rate of $H_2$ is preferably lower than a particular value. The electric current is preferably 200 to 400 A, the voltage is preferably 180 to 280 V, and the electric power is preferably 40 to 105 kW. The scanning speed is preferably 100 to 200 mm/s.

The properties of the material are the same as those of the cases of the plasma spraying and the HVOF spraying.

The annealing treatment after the spraying is also preferably performed in the same manner as in the case of the plasma spraying.

Sprayed Member

A sprayed member according to an embodiment of the present invention includes an yttrium oxide sprayed coating and an yttrium oxyfluoride sprayed coating disposed on a substrate in this order. In the yttrium oxyfluoride sprayed coating, when the total intensity of all peaks attributable to yttrium oxyfluoride in a diffraction spectrum obtained by X-ray diffractometry is assumed to be 100, the total intensity of all peaks attributable to yttrium fluoride and yttrium oxide is less than 10. The substrate may be made of a material, e.g., a metal such as aluminum, aluminum alloy, or stainless steel or a ceramic such as quartz glass or alumina.

A sprayed member according to another embodiment of the present invention includes an yttrium oxide sprayed coating and an yttrium oxyfluoride sprayed coating not containing yttrium oxide that are disposed on a substrate in this order. In the yttrium oxyfluoride sprayed coating, when the total intensity of all peaks attributable to yttrium oxyfluoride and yttrium fluoride in a diffraction spectrum obtained by X-ray diffractometry is assumed to be 100, the total intensity of all peaks attributable to yttrium oxide is less than 1. The substrate may be made of a material, e.g., a metal such as aluminum, aluminum alloy, or stainless steel or a ceramic such as quartz glass or alumina.

The sprayed member according to an embodiment of the present invention or the sprayed member according to another embodiment of the present invention includes an yttrium oxide sprayed coating on an aluminum substrate and the yttrium oxyfluoride sprayed coating or yttrium oxyfluoride-containing sprayed coating according to an embodiment of the present invention on the yttrium oxide sprayed coating. When the yttrium oxide sprayed coating is interposed between the aluminum substrate and the yttrium oxyfluoride sprayed coating or yttrium oxyfluoride-containing sprayed coating according to an embodiment of the present invention, the adhesion is higher than that in the case where the yttrium oxyfluoride sprayed coating or yttrium oxyfluoride-containing sprayed coating according to an embodiment of the present invention is directly formed on the aluminum substrate. This is because, in particular, when the substrate is made of a metal (e.g., aluminum or titanium), yttrium oxide has better wettability to the substrate than yttrium oxyfluoride in a chemical manner.

In the sprayed member according to an embodiment of the present invention, the yttrium oxyfluoride sprayed coating or the yttrium oxyfluoride-containing sprayed coating has a thickness of 10 to 200 μm. In this case, the yttrium oxide sprayed coating preferably has a thickness of 10 to 200 μm to achieve sufficient adhesion.

The sprayed member according to an embodiment of the present invention preferably further includes a sprayed coating containing yttrium oxide and yttrium oxyfluoride between the yttrium oxide sprayed coating and the yttrium oxyfluoride sprayed coating or yttrium oxyfluoride-containing sprayed coating according to an embodiment of the present invention. The sprayed coating has an intermediate linear expansion coefficient between the yttrium oxide sprayed coating and the yttrium oxyfluoride sprayed coating or yttrium oxyfluoride-containing sprayed coating according to an embodiment of the present invention. Therefore, the thermal stress applied to the interfaces between the sprayed coatings can be relaxed.

The mass ratio (X/Y) of the mass (X) of yttrium oxide to the total mass (Y) of yttrium oxyfluoride and yttrium fluoride in the sprayed coating containing yttrium oxide and yttrium oxyfluoride, the sprayed coating being disposed between the yttrium oxide sprayed coating and the yttrium oxyfluoride sprayed coating or yttrium oxyfluoride-containing sprayed coating according to an embodiment of the present invention, is preferably 0.3 to 0.7 from the viewpoint of relaxing thermal expansion. The sprayed coating preferably has a thickness of 10 to 200 μm.

Each of the sprayed coatings in the sprayed member according to an embodiment of the present invention can be formed by plasma spraying. The plasma spraying conditions for each of the sprayed coatings are the same as those for the above-described yttrium oxyfluoride sprayed coating.

The yttrium oxyfluoride-containing sprayed coating in the sprayed member according to an embodiment of the present invention can be formed by HVOF spraying or high-velocity plasma spraying. The spraying conditions for the sprayed coating are the same as the HVOF spraying conditions or the high-velocity plasma spraying conditions for the above-described sprayed coating.

EXAMPLES

Hereafter, the present invention will be further specifically described based on Examples, but the present invention is not limited to Examples below.

Example 1

A powder material (particle diameter: 25 μm) containing yttrium oxyfluoride and having an oxygen content of 8.5 mass % was provided. The material was subjected to X-ray diffraction with an X-ray diffractometer (MultiFlex manufactured by Rigaku Corporation) under the following conditions to obtain an X-ray diffraction spectrum. FIG. 1(A) illustrates the obtained X-ray diffraction spectrum.
X-ray source: Cu-Kα rays (wavelength: 1.54060 Å)
Scanning step: 0.02°
Scanning axis: 2θ
Scanning range: 10° to 80°

Subsequently, the material was subjected to plasma spraying onto a substrate (aluminum alloy: A6061) to form an yttrium oxyfluoride sprayed coating having a thickness of 200 μm. The plasma spraying conditions were as follow.
Plasma spraying apparatus: APS-7100 manufactured by Aeroplasma Co., Ltd.
Working gas: Ar and $O_2$
Scanning speed: 100 to 1000 mm/s
Spraying distance: 80 mm
Spraying velocity: 150 to 330 m/s
Electric current: 80 to 110 A
Voltage: 240 to 280 V
Electric power: 19 to 31 kW An X-ray diffraction spectrum of the formed sprayed coating was obtained in the same manner as in the case of the above-described material. FIG. 1(B) illustrates the obtained X-ray diffraction spectrum. As is clear from FIG. 1(B), the formed sprayed coating contains crystal phases of $Y_5O_4F_7$ and YOF.

Furthermore, the formed sprayed coating was annealed in an atmospheric furnace at 300° C. for 2 hours. Then, an X-ray diffraction spectrum of the annealed sprayed coating was obtained in the same manner as in the case of the above-described material. FIG. 1(C) illustrates the obtained X-ray diffraction spectrum. There is no difference between the diffraction spectrum in FIG. 1(B) and the diffraction spectrum in FIG. 1(C), which makes it clear that the sprayed coating after the plasma spraying has sufficient stability. Table 1 shows crystal phases contained in each of the material, the sprayed coating, and the annealed coating.

In (A) to (C) of FIG. 1, the X-ray diffraction spectra are laid on one another in a vertical-axis direction from the bottom to the top for ease of comparison. Therefore, the intensity on the vertical axis is not an absolute intensity, but is a relative intensity.

Example 2

A powder material (particle diameter: 25 μm) containing yttrium oxyfluoride and yttrium fluoride and having an oxygen content of 7.0 mass % was provided. The material was subjected to plasma spraying onto a substrate in the same manner as in Example 1 to form an yttrium oxyfluoride sprayed coating having a thickness of 200 μm, and then annealing treatment was performed. Table 1 shows crystal phases identified from the X-ray diffraction spectra of the material, the formed sprayed coating, and the annealed sprayed coating.

Example 3

A powder material (particle diameter: 25 μm) containing yttrium oxyfluoride and having an oxygen content of 11.5 mass % was provided. The material was subjected to plasma spraying onto a substrate in the same manner as in Example 1 to form an yttrium oxyfluoride sprayed coating having a thickness of 200 μm, and then annealing treatment was performed. Table 1 shows crystal phases identified from the X-ray diffraction spectra of the material, the formed sprayed coating, and the annealed sprayed coating.

As in Example 1, the formed sprayed coatings in Examples 2 and 3 contain crystal phases of $Y_5O_4F_7$ and YOF. There is no difference before and after the annealing treatment and the sprayed coating has sufficient stability.

Example 4

An yttrium oxide sprayed coating having a thickness of 100 μm was formed on an aluminum substrate (thickness: 5 mm) by performing plasma spraying. A material containing yttrium oxyfluoride and having an oxygen content of 8.5 mass % was subjected to plasma spraying under the same spraying conditions as those in Example 1 to form an yttrium oxyfluoride sprayed coating having a thickness of 50 μm on the yttrium oxide sprayed coating. The plasma spraying conditions for forming the yttrium oxide sprayed coating were the same as those of the yttrium oxyfluoride sprayed coating in Example 1.

Subsequently, the adhesion of the yttrium oxyfluoride sprayed coating in Example 4 and the yttrium oxyfluoride sprayed coating in Example 1 was measured with a tensile tester. The adhesion of the sprayed coating to the substrate was higher in the case where the yttrium oxide sprayed coating was formed on the aluminum substrate and the yttrium oxyfluoride sprayed coating was formed thereon than in the case where the yttrium oxyfluoride sprayed coating was directly formed on the aluminum substrate.

Comparative Example 1

A powder material (particle diameter: 25 μm) containing yttrium oxyfluoride and yttrium fluoride and having an oxygen content of 6.4 mass % was provided. The material was subjected to plasma spraying onto a substrate in the same manner as in Example 1 to form an yttrium oxyfluoride sprayed coating having a thickness of 200 μm, and then annealing treatment was performed. Table 1 shows crystal phases identified from the X-ray diffraction spectra of the material, the formed sprayed coating, and the annealed sprayed coating. The X-ray diffraction spectra show that the material contains crystal phases of $Y_5O_4F_7$ and $YF_3$ (orthorhombic crystal), the formed sprayed coating contains crystal phases of $Y_5O_4F_7$ and $YF_3$ (heterogeneous phase), and the annealed sprayed coating contains crystal phases of $Y_5O_4F_7$ and $YF_3$ (orthorhombic crystal). Therefore, sufficient stability is not achieved.

Comparative Example 2

A powder material (particle diameter: 25 μm) containing yttrium oxyfluoride and having an oxygen content of 12.0 mass % was provided. The material was subjected to plasma spraying onto a substrate in the same manner as in Example 1 to form an yttrium oxyfluoride sprayed coating having a thickness of 200 μm, and then annealing treatment was performed. Table 1 shows crystal phases identified from the X-ray diffraction spectra of the material, the formed sprayed coating, and the annealed sprayed coating. The X-ray diffraction spectra show that the material contains a YOF single phase, but the formed sprayed coating and the annealed sprayed coating contain crystal phases of YOF and $Y_2O_3$. Therefore, sufficient stability is not achieved.

TABLE 1

| | | Crystal phase | | | | | |
| --- | --- | --- | --- | --- | --- | --- | --- |
| | | | | | YF$_3$ | | |
| | | $Y_2O_3$ | YOF | $Y_5O_4F_7$ | Orthorhombic crystal | Heterogeneous phase | Stability |
| Example 1 | Material | — | — | Presence | — | — | — |
| | After plasma spraying | — | Presence | Presence | — | — | Good |
| | After annealing | — | Presence | Presence | — | — | — |
| Example 2 | Material | — | — | Presence | Presence | — | — |
| | After plasma spraying | — | Presence | Presence | — | — | Good |
| | After annealing | — | Presence | Presence | — | — | — |

TABLE 1-continued

|  |  | Y$_2$O$_3$ | YOF | Y$_5$O$_4$F$_7$ | YF$_3$ Orthorhombic crystal | YF$_3$ Heterogeneous phase | Stability |
|---|---|---|---|---|---|---|---|
| Example 3 | Material | — | Presence | Presence | — | — | — |
|  | After plasma spraying | — | Presence | Presence | — | — | Good |
|  | After annealing | — | Presence | Presence | — | — | — |
| Comparative Example 1 | Material | — | — | Presence | Presence | — | — |
|  | After plasma spraying | — | — | Presence | — | Presence | Poor |
|  | After annealing | — | — | Presence | Presence | — | — |
| Comparative Example 2 | Material | — | Presence | — | — | — | — |
|  | After plasma spraying | Presence | Presence | — | — | — | Poor |
|  | After annealing | Presence | Presence | — | — | — | — |

In the evaluation of the stability, an evaluation of "Good" was given when there was no difference between the crystal phases before and after the annealing treatment, and an evaluation of "Poor" was given when there was a difference between the crystal phases before and after the annealing treatment.

The crystal phases were identified with an X-ray diffractometer (MultiFlex manufactured by Rigaku Corporation). If the measurement is not precisely performed because of the influence of a base below the sprayed coating to be measured, in-plane X-ray diffractometry (XRD), electron spectroscopy for chemical analysis (ESCA), or transmission electron microscopy (TEM) may be used instead when needed.

Example 5

A slurry material (particle diameter: 2 µm) containing yttrium oxyfluoride and yttrium fluoride and having an oxygen content of 5.6 mass % was provided.

Subsequently, the material was subjected to HVOF spraying onto a substrate (aluminum alloy: A6061) to form an yttrium oxyfluoride sprayed coating having a thickness of 200 µm. The HVOF spraying conditions were as follows.
O$_2$ flow rate: 480 L/min
Kerosene flow rate: 180 mL/min
Scanning speed: 1000 mm/s
Spraying distance: 100 mm
Spraying velocity: 450 m/s An X-ray diffraction spectrum of the formed sprayed coating was determined in the same manner as in Example 1. FIG. 2(B) illustrates the determined X-ray diffraction spectrum. As is clear from FIG. 2(B), the formed sprayed coating contains crystal phases of Y$_5$O$_4$F$_7$, YF$_3$, and YOF, but does not contain a crystal phase of Y$_2$O$_3$. FIG. 2(A) illustrates the diffraction spectrum of the material to be sprayed.

Furthermore, the formed sprayed coating was annealed in an atmospheric furnace at 300° C. for 2 hours. Subsequently, an X-ray diffraction spectrum of the annealed sprayed coating was determined in the same manner as in the case of the above-described material. FIG. 2(C) illustrates the determined X-ray diffraction spectrum. The comparison between the diffraction spectra in FIG. 2(B) and FIG. 2(C) shows that YF$_3$ (heterogeneous phase) is eliminated. Therefore, the sprayed coating after the HVOF spraying has sufficient stability. Table 2 also shows crystal phases contained in each of the material, the sprayed coating, and the annealed coating.

Figure 2:
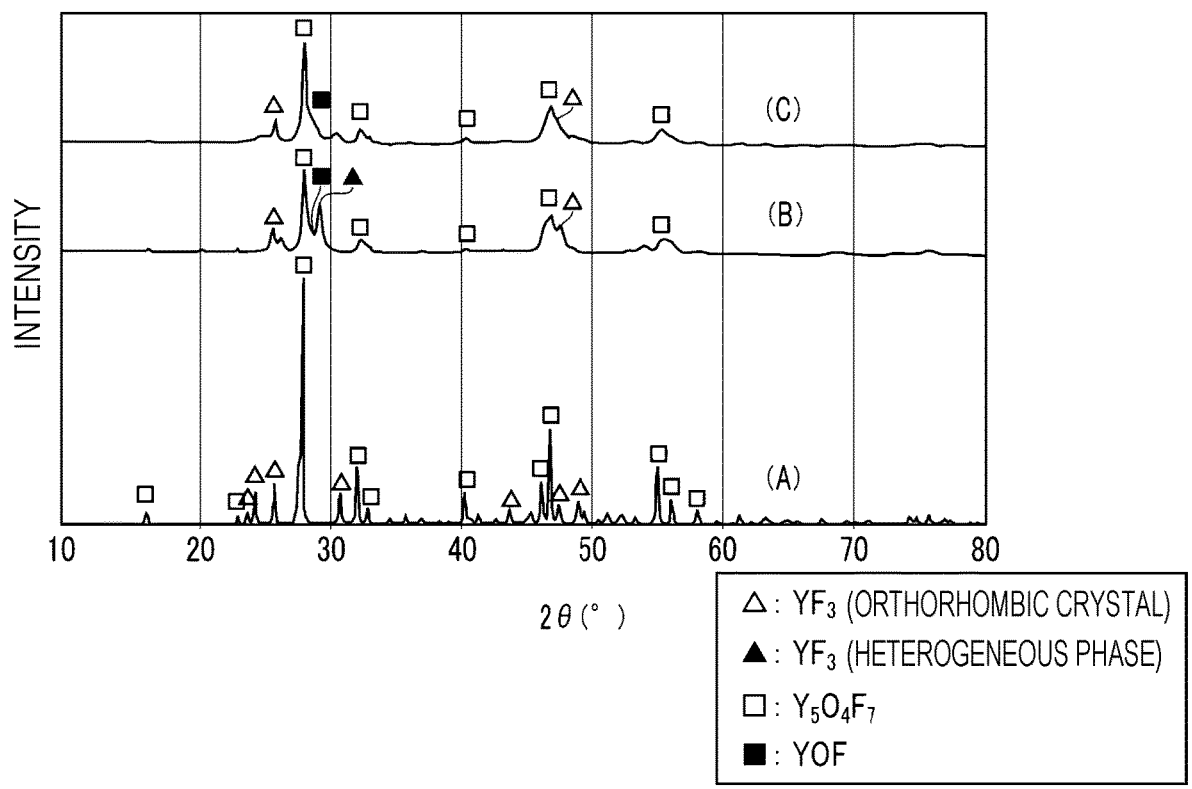
FIG. 2 illustrates X-ray diffraction spectra of a material (A), an yttrium oxyfluoride-containing sprayed coating (B), and an annealed yttrium oxyfluoride-containing sprayed coating (C) used in Example 5.

In (A) to (C) of FIG. 2, the X-ray diffraction spectra are also laid on one another in a vertical-axis direction from the bottom to the top for ease of comparison. Therefore, the intensity on the vertical axis is not an absolute intensity, but is a relative intensity.

Example 6

A slurry material (particle diameter: 2 µm) containing yttrium oxyfluoride and yttrium fluoride and having an oxygen content of 2.2 mass % was provided. The material was subjected to HVOF spraying onto a substrate in the same manner as in Example 5 to form an yttrium oxyfluoride sprayed coating having a thickness of 200 µm, and then annealing treatment was performed. Table 2 shows crystal phases identified from the X-ray diffraction spectra of the material, the formed sprayed coating, and the annealed sprayed coating.

Example 7

A slurry material (particle diameter: 2 µm) containing yttrium fluoride (oxygen content: 0 mass %) was provided. The material was subjected to HVOF spraying onto a substrate in the same manner as in Example 5 to form an yttrium oxyfluoride sprayed coating having a thickness of 200 µm, and then annealing treatment was performed. Table 2 shows crystal phases identified from the X-ray diffraction spectra of the material, the formed sprayed coating, and the annealed sprayed coating.

Example 8

A slurry material (particle diameter: 2 µm) containing yttrium oxyfluoride and yttrium fluoride and having an oxygen content of 6.0 mass % was provided. The material was subjected to HVOF spraying onto a substrate in the same manner as in Example 5 to form an yttrium oxyfluoride sprayed coating having a thickness of 200 µm, and then annealing treatment was performed. Table 2 shows crystal phases identified from the X-ray diffraction spectra of the material, the formed sprayed coating, and the annealed sprayed coating.

In Examples 6 to 8, as in Example 5, the formed sprayed coating does not contain a crystal phase of $Y_2O_3$, but contains crystal phases of $Y_5O_4F_7$ and $YF_3$ or crystal phases of $Y_5O_4F_7$, $YF_3$, and YOF, and $YF_3$ (heterogeneous phase) is eliminated after the annealing treatment. Therefore, the sprayed coatings have sufficient stability.

Example 9

An yttrium oxide sprayed coating having a thickness of 100 μm was formed on an aluminum substrate (thickness: 5 mm) by performing plasma spraying. A slurry material containing yttrium oxyfluoride and yttrium fluoride and having an oxygen content of 5.6 mass % was subjected to HVOF spraying onto the yttrium oxide sprayed coating under the same spraying conditions as those in Example 5 to form an yttrium oxyfluoride-containing sprayed coating having a thickness of 50 μm. The plasma spraying conditions for forming the yttrium oxide sprayed coating were the same as the plasma spraying conditions for forming the yttrium oxyfluoride sprayed coating in Example 1.

Subsequently, the adhesion of the yttrium oxyfluoride-containing sprayed coatings in Example 9 and Example 5 was measured with a tensile tester. The adhesion of the sprayed coating to the substrate was higher in the case where the yttrium oxide sprayed coating was formed on the aluminum substrate and the yttrium oxyfluoride-containing sprayed coating was formed thereon.

Comparative Example 3

A slurry material (particle diameter: 2 μm) containing yttrium oxyfluoride and having an oxygen content of 8.4 mass % was provided. The material was subjected to HVOF spraying onto a substrate in the same manner as in Example 5 to form an yttrium oxyfluoride sprayed coating having a thickness of 200 μm, and then annealing treatment was performed. Table 2 shows crystal phases identified from the X-ray diffraction spectra of the material, the formed sprayed coating, and the annealed sprayed coating. As is clear from the X-ray diffraction spectra, a crystal phase of $Y_2O_3$ appears in the formed sprayed coating and the annealed sprayed coating and thus sufficient stability is not achieved.

TABLE 2

| | | Crystal phase | | | | | |
|---|---|---|---|---|---|---|---|
| | | | | | $YF_3$ | | |
| | | $Y_2O_3$ | YOF | $Y_5O_4F_7$ | Orthorhombic crystal | Heterogeneous phase | Stability |
| Example 5 (5.6 wt %) | Material | — | — | Presence | Presence | — | — |
| | After HVOF spraying | — | Presence | Presence | Presence | Presence | Good |
| | After annealing | — | Presence | Presence | Presence | — | |
| Example 6 (2.2 wt %) | Material | — | — | Presence | Presence | — | — |
| | After HVOF spraying | — | — | Presence | Presence | Presence | Good |
| | After annealing | — | — | Presence | Presence | — | |
| Example 7 (0 wt %) | Material | — | — | — | Presence | — | — |
| | After HVOF spraying | — | — | Presence | Presence | Presence | Good |
| | After annealing | — | — | Presence | Presence | — | |
| Example 8 (6.0 wt %) | Material | — | — | Presence | Presence | — | — |
| | After HVOF spraying | — | Presence | Presence | Presence | Presence | Good |
| | After annealing | — | Presence | Presence | Presence | — | |
| Comparative Example 3 (8.4 wt %) | Material | — | — | Presence | — | — | — |
| | After HVOF spraying | Presence | Presence | Presence | — | — | Poor |
| | After annealing | Presence | Presence | Presence | — | — | |

Example 10

A powder material (particle diameter (D50): 25 μm) containing yttrium oxyfluoride and having an oxygen content of 8.4 mass % was provided.

Subsequently, the powder material was subjected to high-velocity plasma spraying onto a substrate (aluminum alloy: A6061) to form an yttrium oxyfluoride sprayed coating having a thickness of 200 μm. The high-velocity plasma spraying conditions were as follows. The above powder material was in the form of granule.
Working gas: Ar, $N_2$, and $H_2$
$H_2$ gas flow rate: 5 L/min
Scanning speed: 850 mm/s
Spraying distance: 90 mm
Spraying velocity: 600 to 700 m/s
Electric current: 400 A
Voltage: 260 V
Electric power: 104 kW
An X-ray diffraction spectrum of the formed sprayed coating was determined in the same manner as in Example 1. FIG. 3(B) illustrates the determined X-ray diffraction spectrum. As is clear from FIG. 3(B), the formed sprayed coating contains crystal phases of $Y_5O_4F_7$ and YOF, but does not contain $Y_2O_3$. FIG. 3(A) illustrates a diffraction spectrum of the material to be sprayed.

Furthermore, the formed sprayed coating was annealed in an atmospheric furnace at 300° C. for 2 hours. Subsequently, an X-ray diffraction spectrum of the annealed sprayed coating was determined in the same manner as in the case of the above-described material. FIG. 3(C) illustrates the determined X-ray diffraction spectrum. The comparison between the diffraction spectra in FIG. 3(B) and FIG. 3(C) shows that there is no difference between the diffraction spectra and thus the sprayed coating after the high-velocity plasma spraying has sufficient stability. Table 3 also shows crystal phases contained in each of the material, the sprayed coating, and the annealed coating.

Figure 3:
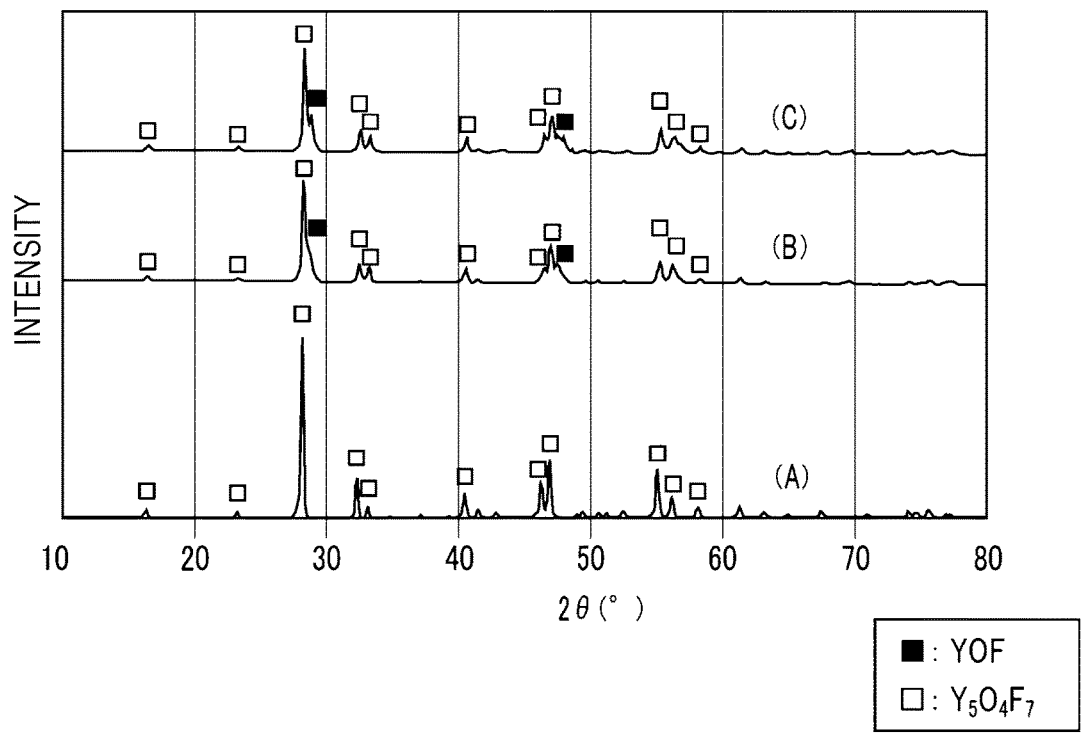
FIG. 3 illustrates X-ray diffraction spectra of a material (A), an yttrium oxyfluoride-containing sprayed coating (B), and an annealed yttrium oxyfluoride-containing sprayed coating (C) used in Example 10.

In (A) to (C) of FIG. 3, the X-ray diffraction spectra are also laid on one another in a vertical-axis direction from the bottom to the top for ease of comparison. Therefore, the intensity on the vertical axis is not an absolute intensity, but is a relative intensity.

Example 11

A powder material (particle diameter: 25 μm) containing yttrium oxyfluoride and yttrium fluoride and having an oxygen content of 4.6 mass % was provided. The powder material was subjected to high-velocity plasma spraying onto a substrate in the same manner as in Example 10 to form an yttrium oxyfluoride sprayed coating having a thickness of 200 μm, and annealing treatment was performed. Table 3 shows crystal phases identified from the X-ray diffraction spectra of the material, the formed sprayed coating, and the annealed sprayed coating.

Example 12

An yttrium oxide sprayed coating having a thickness of 100 μm was formed on an aluminum substrate (thickness: 5 mm) by performing plasma spraying. A powder material (particle diameter: 25 μm) containing yttrium oxyfluoride and yttrium fluoride and having an oxygen content of 5.6 mass % was subjected to high-velocity plasma spraying onto the yttrium oxide sprayed coating under the same conditions as those in Example 10 to form an yttrium oxyfluoride-containing sprayed coating having a thickness of 50 μm. The plasma spraying conditions for forming the yttrium oxide sprayed coating were the same as the plasma spraying conditions for forming the yttrium oxyfluoride sprayed coating in Example 1.

Subsequently, the adhesion of the yttrium oxyfluoride-containing sprayed coatings in Example 12 and Examples 10 and 11 was measured with a tensile tester. The adhesion of the sprayed coating to the substrate was higher in the case where the yttrium oxide sprayed coating was formed on the aluminum substrate and the yttrium oxyfluoride sprayed coating was formed thereon than in the case where the yttrium oxyfluoride sprayed coating was directly formed on the aluminum substrate.

Example 13

A slurry material (particle diameter: 2 μm) containing yttrium oxyfluoride and yttrium fluoride and having an oxygen content of 4.6 mass % was provided. The slurry material was subjected to high-velocity plasma spraying onto a substrate in the same manner as in Example 10 to form an yttrium oxyfluoride sprayed coating having a thickness of 200 μm, and then annealing treatment was performed. It was confirmed from the X-ray diffraction spectrum that a crystal phase of $Y_2O_3$ was not generated in the annealed sprayed coating.

Comparative Example 4

A powder material (particle diameter: 25 μm) containing yttrium oxyfluoride and having an oxygen content of 8.4 mass % was provided. The powder material was subjected to high-velocity plasma spraying onto a substrate to form an yttrium oxyfluoride sprayed coating having a thickness of 200 μm in the same manner as in Example 10, except that the $H_2$ gas flow rate was increased to 70 L/min. Then, annealing treatment was performed. Table 3 shows crystal phases identified from the X-ray diffraction spectra of the material, the formed sprayed coating, and the annealed sprayed coating. As is clear from the X-ray diffraction spectra, a crystal phase of $Y_2O_3$ appears in the annealed sprayed coating and thus sufficient stability is not achieved.

Comparative Example 5

A powder material (particle diameter: 25 μm) containing yttrium oxyfluoride and yttrium fluoride and having an oxygen content of 4.6 mass % was provided. The powder material was subjected to high-velocity plasma spraying onto a substrate to form an yttrium oxyfluoride sprayed coating having a thickness of 200 μm in the same manner as in Example 10, except that the $H_2$ gas flow rate was increased to 70 L/min. Then, annealing treatment was performed. Table 3 shows crystal phases identified from the X-ray diffraction spectra of the material, the formed sprayed coating, and the annealed sprayed coating. As is clear from the X-ray diffraction spectra, a crystal phase of $Y_2O_3$ appears in the annealed sprayed coating and thus sufficient stability is not achieved.

Comparative Example 6

A slurry material (particle diameter: 2 μm) containing yttrium oxyfluoride and yttrium fluoride and having an oxygen content of 4.6 mass % was provided. The slurry material was subjected to high-velocity plasma spraying onto a substrate to form an yttrium oxyfluoride sprayed coating having a thickness of 200 μm in the same manner as in Example 12, except that the $H_2$ gas flow rate was increased to 70 L/min. Then, annealing treatment was performed. As is clear from the X-ray diffraction spectrum, $Y_2O_3$ is partly generated in the annealed sprayed coating and thus sufficient stability is not achieved.

The sprayed coatings in Examples 10 to 12 contain crystal phases of $Y_5O_4F_7$, YOF, and $YF_3$ and do not contain a crystal phase of $Y_2O_3$, and thus the annealed sprayed coatings have sufficient stability. In contrast, a crystal phase of $Y_2O_3$ is generated in the sprayed coatings formed by performing high-velocity plasma spraying in Comparative Examples 4 to 6 in which the $H_2$ gas flow rate is increased, and thus the annealed sprayed coatings have insufficient stability.

TABLE 3

| | | Crystal phase | | | | | |
|---|---|---|---|---|---|---|---|
| | | | | | YF$_3$ | | |
| | | Y$_2$O$_3$ | YOF | Y$_5$O$_4$F$_7$ | Orthorhombic crystal | Heterogeneous phase | Stability |
| Example 10 (8.4 wt %) (low H$_2$ flow rate) | Material | — | — | Presence | — | — | — |
| | After high-velocity plasma spraying | — | Presence | Presence | — | — | Good |
| | After annealing | — | Presence | Presence | — | — | |
| Example 11 (4.6 wt %) (low H$_2$ flow rate) | Material | — | — | Presence | Presence | — | — |
| | After high-velocity plasma spraying | — | Presence | Presence | Presence | Presence | Good |
| | After annealing | — | Presence | Presence | Presence | — | |
| Example 12 (4.6 wt %) (low H$_2$ flow rate) | Material | — | — | Presence | Presence | — | — |
| | After high-velocity plasma spraying | — | Presence | Presence | Presence | Presence | Good |
| | After annealing | — | Presence | Presence | Presence | — | |
| Comparative Example 4 (8.4 wt %) (high H$_2$ flow rate) | Material | — | — | Presence | — | — | — |
| | After high-velocity plasma spraying | Presence | Presence | Presence | — | — | Poor |
| | After annealing | Presence | Presence | Presence | — | — | |
| Comparative Example 5 (4.6 wt %) (high H$_2$ flow rate) | Material | — | — | Presence | Presence | — | — |
| | After high-velocity plasma spraying | Presence | Presence | Presence | Presence | Presence | Poor |
| | After annealing | Presence | Presence | Presence | Presence | — | |
| Comparative Example 6 (4.6 wt %) (high H$_2$ flow rate) | Material | — | — | Presence | Presence | — | — |
| | After high-velocity plasma spraying | Presence | Presence | Presence | Presence | Presence | Poor |
| | After annealing | Presence | Presence | Presence | Presence | — | |

What is claimed is:

1. A sprayed member comprising an yttrium oxide sprayed coating disposed directly on a metal substrate and an yttrium oxyfluoride sprayed coating disposed over the yttrium oxide sprayed coating, wherein, in the yttrium oxyfluoride sprayed coating, when a total intensity of all peaks attributable to yttrium oxyfluoride in a diffraction spectrum obtained by X-ray diffractometry is assumed to be 100, a total intensity of all peaks attributable to yttrium fluoride and yttrium oxide is less than 10, wherein the sprayed member further comprises a sprayed coating containing yttrium oxide and yttrium oxyfluoride combined together in a single intermediate layer disposed between the yttrium oxide sprayed coating and the yttrium oxyfluoride sprayed coating, and wherein the metal substrate is an aluminum substrate or a titanium substrate.

* * * * *